United States Patent
Kobylinski et al.

(10) Patent No.: US 6,694,138 B1
(45) Date of Patent: *Feb. 17, 2004

(54) MOBILE ASSISTED HANDOFF SYSTEM AND METHOD

(75) Inventors: Richard A. Kobylinski, Austin, TX (US); Milap V. Majmundar, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.
This patent is subject to a terminal disclaimer.

(21) Appl. No.: 09/534,735

(22) Filed: Mar. 27, 2000

Related U.S. Application Data

(63) Continuation of application No. 08/804,658, filed on Feb. 25, 1997, now Pat. No. 6,044,272.

(51) Int. Cl.⁷ .................................................. H04Q 7/20
(52) U.S. Cl. .................... 455/437; 455/436; 455/502; 370/331
(58) Field of Search ............................. 455/436, 437, 455/434, 439, 502, 226.2, 226.3, 226.4, 503, 438, 432, 450, 442; 370/331, 332, 333

(56) References Cited

U.S. PATENT DOCUMENTS

| | | | | |
|---|---|---|---|---|
| 5,008,953 | A | 4/1991 | Dahlin et al. ................. 455/33 |
| 5,042,082 | A | 8/1991 | Dahlin ........................ 455/33 |
| 5,157,661 | A | 10/1992 | Kanai et al. |
| 5,200,957 | A | * 4/1993 | Dahlin ...................... 370/100.1 |
| 5,228,029 | A | 7/1993 | Kotzin ...................... 370/95.1 |
| 5,257,401 | A | * 10/1993 | Dahlin et al. ............... 455/33.2 |
| 5,267,261 | A | 11/1993 | Blakeney, II et al. .......... 375/1 |
| 5,297,169 | A | 3/1994 | Backstrom et al. ........... 375/13 |
| 5,379,447 | A | 1/1995 | Bonta et al. |
| 5,381,443 | A | 1/1995 | Borth et al. .................... 375/1 |
| 5,410,733 | A | 4/1995 | Niva et al. ................. 455/33.2 |
| 5,428,816 | A | 6/1995 | Barnett et al. ............. 455/33.2 |
| 5,432,843 | A | 7/1995 | Bonta |
| 5,483,669 | A | 1/1996 | Barnett et al. ............. 455/33.2 |
| 5,493,563 | A | * 2/1996 | Rozanski et al. ............. 370/50 |
| 5,517,673 | A | 5/1996 | Fehnel ...................... 455/33.1 |
| 5,517,674 | A | 5/1996 | Rune ........................ 455/33.2 |
| 5,640,677 | A | * 6/1997 | Karlsson ................... 455/33.2 |
| 5,652,748 | A | 7/1997 | Jolma et al. |
| 5,722,073 | A | 2/1998 | Wallstedt et al. |
| 5,740,535 | A | 4/1998 | Rune |
| 5,778,075 | A | 7/1998 | Haartsen |
| 5,867,786 | A | * 2/1999 | Ishi .......................... 455/436 |
| 5,966,657 | A | * 10/1999 | Sporre ....................... 455/425 |
| 5,974,320 | A | * 10/1999 | Ward et al. ................. 455/437 |
| 6,028,854 | A | * 2/2000 | Raith et al. ................. 370/347 |
| 6,044,272 | A | 3/2000 | Kobylinski et al. |
| 6,185,422 | B1 | * 2/2001 | Mattila ....................... 455/434 |
| 6,330,450 | B1 | * 12/2001 | Wallstedt et al. ........... 455/447 |

* cited by examiner

*Primary Examiner*—Erika Gary
(74) *Attorney, Agent, or Firm*—Brinks Hofer Gilson & Lione

(57) ABSTRACT

A system and method for improved mobile assisted handoff in a digital cellular communication system that gives the mobile station the ability to synchronize to candidate base station transmissions in order to read the transmitted digital voice color code (DVCC) of the candidate station. This process is performed during the idle period between two designated time slots in a TDMA frame. The invention is an enhancement to the existing mobile assisted handoff procedures described in the existing IS-136 standard. The present invention improves on the IS-136 standard's use of received signal strength measurements in that it allows the mobile station to acquire and report information regarding the digital verification color code (DVCC) of the candidate base station channels. Since the DVCC uniquely identifies the cell site to which a channel belongs, it is used to distinguish the candidate base station channel from its co-channel interferers, allowing the network to make a more informed handoff decision.

7 Claims, 3 Drawing Sheets

MOBILE ASSISTED HANDOFF SYSTEM AND METHOD

CROSS-REFERENCE TO RELATED APPLICATION

This application is a continuation of U.S. patent application Ser. No. 08/804,658, filed Feb. 25, 1997 (now U.S. Pat. No. 6,044,272).

BACKGROUND OF THE INVENTION

1. Field of the Invention

The present invention relates generally to digital cellular mobile radio communication systems. The present invention relates more specifically to a method and system for effecting an improved mobile assisted handoff operation as the mobile station moves from one cell to another within a cellular communication network.

2. Description of the Related Art

In cellular mobile communication systems where a mobile station (MS) may be constantly moving, it is essential that the radio communications link with the mobile station be maintained when the station moves from one cell served by one base station (BS) to a second cell served by a different base station. The process of handing over the communications link from one base station to another, in a manner that is transparent to the user, is known as handoff.

The most commonly used criteria to determine the need for a handoff is received signal strength (RSS). In first generation cellular systems such as the Advanced Mobile Phone System (AMPS), the serving base station performs a received signal strength measurement on the signal received from the mobile station and uses this information to make a handoff decision. In such a system and method, there is no mobile station involvement in the measurement or decision making process.

Second generation digital cellular communication systems such as the IS-136 and GSM systems have introduced mobile assisted handoff (MAHO) where the mobile station assists the base station in the handoff decision making process by itself performing received signal strength and bit error rate (BER) measurements.

In the IS-136 system, the mobile station performs received signal strength and bit error rate measurements on the channel it is currently operating on and only received signal strength measurements on a list of candidate channels supplied to it by the base station. The RSS measurements on candidate channels are performed during the idle period between designated time slots in the communication link.

A technique called Digital Locate has also been developed by network infrastructure manufacturers that allows candidate base stations to perform received signal strength measurements on the mobile station in question and allows the base station to synchronize to the mobile station's transmissions to verify the identity of the mobile station.

In the GSM system, the mobile station also performs received signal strength measurements during the idle period between designated time slots. In addition, since the frame structure of GSM has one idle time frame per multi-frame, during this idle time frame the mobile station synchronizes to the broadcast control channel (BCCH) of a candidate base station and reads the base station identification code (BSIC) to verify the identity of the base station. A number of patents, including U.S. Pat. Nos. 5,042,082, 5,200,957, and 5,257,401, describe systems within which the mobile station performs received signal strength measurements on a list of target base station channels. The base station then supplies the color code information of the mobile station to the target base stations and the target base stations measure the received signal strength of the mobile station in question and synchronize to the mobile station's transmissions to read its color code.

Other patents, including U.S. Pat. No. 5,493,563, describe systems where measurements on voice channels of adjacent cells are performed. In addition, U.S. Pat. No. 5,157,661 describes a system where a communication test is performed on candidate channels during the free time of a time division multiplexed channel.

Despite the above efforts at improving the mobile assisted handoff operation, there are still serious drawbacks to the accuracy of the systems and their ability to identify and designate the most appropriate base station to receive the handoff. By involving the mobile station in the appropriate selection of a base station handoff, the accuracy improves, but remains a problem even with the kinds of measurements mentioned in the above patents.

SUMMARY OF THE INVENTION

It is therefore an object of the present invention to provide a system and method to improve the quality of the handoff decision by allowing the mobile station to synchronize to candidate base station transmissions for identity verification purposes, thus reducing the probability of a dropped call due to an erroneous handoff decision.

It is a further object of the present invention to provide a system wherein a mobile station has the ability to synchronize to candidate base station transmissions and to read the transmitted digital voice color code (DVCC).

It is a further object of the present invention to provide a method wherein a mobile station synchronizes to a candidate base station's transmissions and reads the DVCC, thus assisting in verifying the identity of the base station.

It is a further object of the present invention to provide a system and method that avoid problems associated with strong co-channel interferers in the RSS measurements reported by a mobile station.

It is a further object of the present invention to incorporate into the mobile station certain functions currently performed by Digital Locate systems, thus permitting the elimination of separate Digital Locate radio transceivers.

It is a further object of the present invention to implement a system and method for improved mobile assisted handoff that requires a minimal amount of additional computational and memory resources in the mobile station.

In fulfillment of these and other objectives, the present invention provides a system and method that give the mobile station the ability to synchronize to candidate base station's transmissions in order to read the transmitted digital voice color code (DVCC). This process is performed during the idle period between two designated time slots in a frame. The mobile station performing the process does not need advance synchronization information regarding the candidate handoff channels in order to read the DVCC. The invention is an enhancement to the existing mobile assisted handoff procedures described in the IS-136 standard. In the existing IS-136 standard, the mobile station performs a received signal strength measurement on candidate base station channels. The present invention improves on the use of received signal strength measurements in that it allows the mobile station to acquire and report information regarding the digital verification color code (DVCC) of the candidate base station channels. Since the DVCC uniquely identifies the cell site to which a channel belongs, it is used to distinguish the candidate base station channel (and its RSS measurements) from its co-channels (and their RSS measurements), allowing the network to make a more informed handoff decision.

In summary, the function of the improved mobile assisted handoff method is as follows:

Step 1: When mobile assisted handoff procedures are activated, the current base station issues a first measurement order containing a list of up to 24 channels for the mobile station to take signal strength measurements on.

Step 2: Upon receipt of the first measurement order, the mobile station begins to measure received signal strength and bit error rate on its current channel and received signal strength on the candidate channels listed in the first measurement order. These measurements are made during the mobile station's idle time slots.

Step 3: The measurement results are reported back to the current base station in the channel quality message.

Step 4: Based on the measurement results reported in the channel quality message by the mobile station, the current base station selects a number of the most favorable channels, for example three (3), and issues a second measurement order to the mobile station with a list of the candidate handoff channels.

Step 5: Upon receipt of the second measurement order, the mobile station attempts to synchronize to each of the candidate channels during its idle time slots. The mobile station reads and decodes the digital verification color code to obtain the DVCC for each channel.

Step 6: The mobile station returns the measured values of each DVCC to the current base station.

Step 7: The network then makes a handoff decision based upon all of the information provided.

DESCRIPTION OF THE PREFERRED EMBODIMENT

Figure 2:
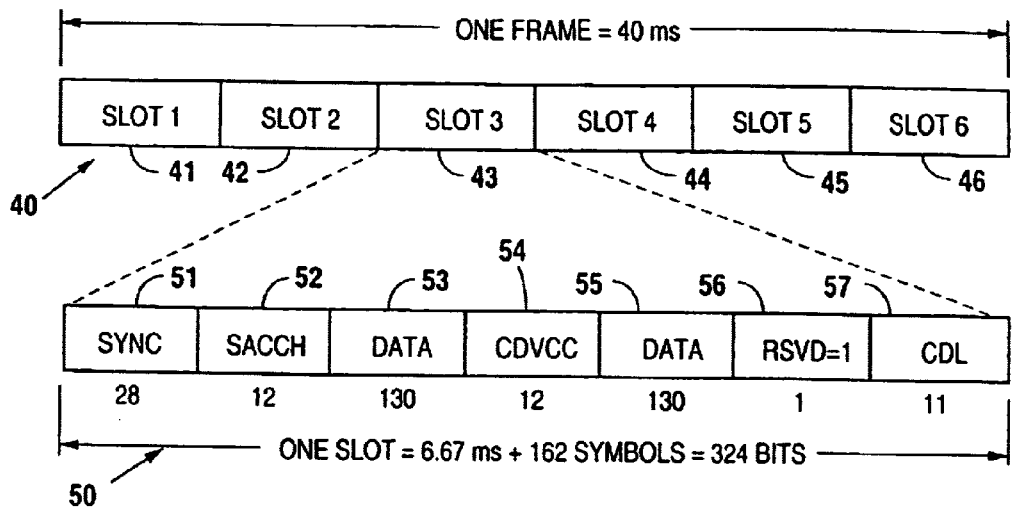
FIG. 2 is a schematic diagram showing the frame structure and base station to mobile station time slot format for the IS-136 standard.

In a digital cellular mobile communication system such as is defined by the IS-136 standard, where a number of users are time division multiplexed (TDMA) into one channel, each mobile station on the channel transmits and receives in bursts corresponding to its allotted time slot. FIG. 2 shows the TDMA frame format, and the base station to mobile station slot format for the IS-136 system.

In this format, every TDMA frame (40) supports up to three users, each using one pair of time slots, for full rate digital traffic channel operation. Each mobile station is assigned every third time slot, for example; slot 1 (41) and slot 4 (44), slot 2 (42) and slot 5 (45), or slot 3 (43) and slot 6 (46). Thus, each mobile station is idle for two time slots between its allotted pair of time slots. This idle period of 13.33 ms occurs once every half frame and is utilized in the present invention to facilitate mobile assisted handoff.

FIG. 2 also discloses the format of an individual time slot within frame (40). Each time slot is structured the same as is disclosed for time slot 3 (43) given as an example. One such time slot (50) has a duration of 6.67 ms and contains 162 symbols each of which represents two bits, thus comprising a total of 324 bits. In the IS-136 format, various digital words are communicated in specified portions of each time slot. As shown in FIG. 2, time slot (50) is comprised of SYNC word (51) made up of 28 bits, SACCH word (52) made up of 12 bits, followed by a first data section (53) made up of 130 bits. The first data section (53). is followed by the coded digital voice color code (CDVCC) word (54) made up of 12 bits. A second data section (55) made up of 130 bits then follows with a single bit RSVD word (56) and a CDL word (57) made up of 11 bits terminating the time slot (50). Of particular concern to the present invention are the SYNC word (51) and the CDVCC word (54). It is these two elements of information that are necessary for the mobile station to accurately identify candidate base stations for which it is making received signal strength measurements.

Figure 1:
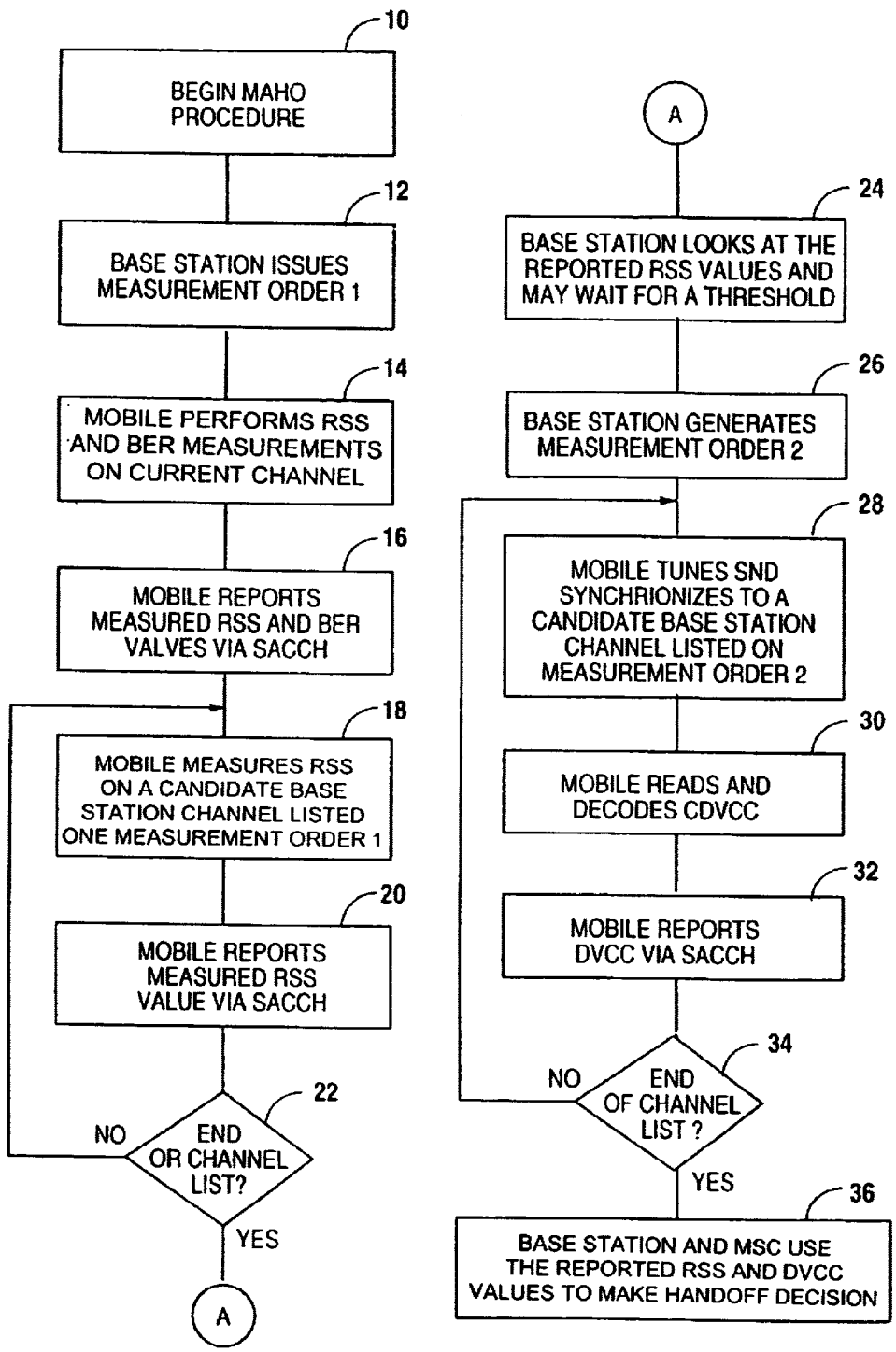
FIGS. 1a and 1b are flow charts showing the steps of the method of the present invention.

Reference is now made back to FIGS. 1a and 1b for a detailed description of the steps of the method of the present invention for implementing the mobile assisted handoff. When mobile assisted handoff procedures are activated (step 10), the base station issues a first measurement order (step 12) containing a list of up to 24 channels for the mobile station to take received signal strength (RSS) measurements on. In standard fashion, the mobile station performs RSS and BER measurements on the current base station channel (step 14) and reports the measured RSS and BER values back to the base station via the SACCH word (step 16).

The mobile station then measures the RSS on one entry of the first measurement order list during its idle time slot of each half frame (step 18). This RSS measurement procedure involves tuning the mobile receiver to the candidate channel, taking signal strength measurements, and returning back to the current channel to be able to receive the next designated slot in time. This procedure is described in more detail below with respect to FIG. 3. The mobile station reports the RSS measurement to its current base station (step 20) in the form of a channel quality message which may be transmitted in the corresponding 12 bit SACCH (slow associated control channel) field of the uplink time slot. The mobile station repeats this RSS measurement process for each of the candidate base stations in the channel list (step 22).

After the mobile station finishes processing the first measurement order, the base station may wait until the RSS values on the current and/or the candidate channels cross a threshold (step 24), before taking any further action. The threshold values simply indicate when a handoff is both desirable and possible. The base station determines a number, for example three (3), of the most favorable candidate channels based on the reported RSS measurements, and issues a second measurement order containing a list of candidate channels that the mobile should tune to and read the DVCC.

When the mobile station receives the second measurement order, it must tune to each candidate channel on the list and synchronize to it (step 28), read and decode the coded DVCC (CDVCC) (step 30), and then tune back to its current channel, all within 13.33 ms of idle time. The factors affecting the mobile station's ability to accomplish this are discussed in more detail below. Once again, the mobile station repeats the process described (steps 28, 30 and 32) for each of the candidate channels on the list (step 34). The base station and MSC (mobile switching center) then utilize the reported received signal strength measurements and the DVCC values to distinguish and identify plausible (and the optimal) base stations for handoff, from the inappropriate co-channel interferers that may have returned high RSS measurements (step 36).

Figure 3:
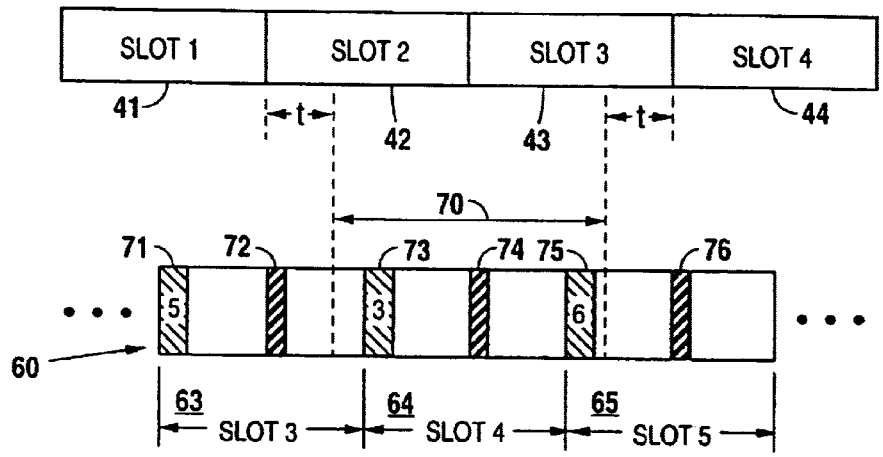
FIG. 3 is a schematic diagram showing a sample time alignment between a current channel and a candidate base station channel on which received signal strength and digital color code measurements are to be made.
Figure 4:
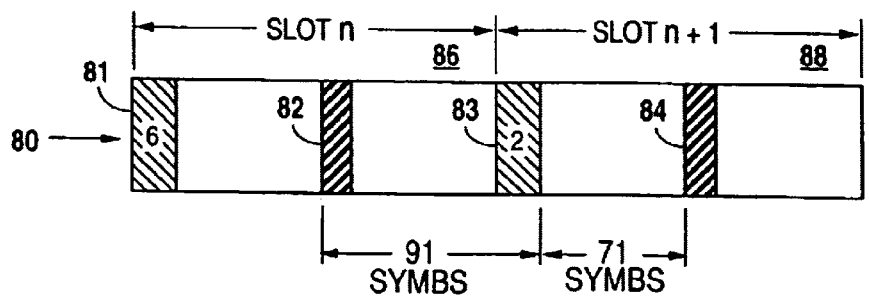
FIG. 4 is a schematic diagram showing the time offset of the SYNC word with respect to the CDVCC word in adjacent time slots.

Reference is now made to FIGS. 3 and 4 for a more detailed description of the process carried out by the mobile station in tuning to candidate channels on the second measurement order list. The ability of the mobile station to carry out the process described above is affected by a number of factors.

First, the candidate channel (60) may not be time aligned with the current channel (40), so the mobile station has to acquire frame synchronization by performing a SYNC word correlation. There are six SYNC words defined by the IS-136 standard, and the candidate handoff channel may contain any of the six SYNC words. Since the mobile station does not know which SYNC words are being used in the candidate channel, it must perform a correlation with all six SYNC words to acquire frame synchronization.

Second, even though the mobile station has 13.33 ms of idle time between its designated time slots, the actual time window available to detect the SYNC word and read the CDVCC may not be the full 13.33 ms but something less because the mobile receiver oscillator requires some time t to tune between the channels and adequately settle.

FIG. 3 discloses a situation where a mobile station uses slot 1 (41) and slot 4 (44) on its current channel (40). During idle slot 2 (42) and idle slot 3 (43), the mobile station tries to read the DVCC from a candidate channel (60). The actual time window (70) "visible" to the mobile is 13.33 ms minus 2t, where t is the time required by the mobile receiver oscillator to tune from one channel to another. In this example, the candidate channel has a time offset such that the mobile station can see slot 4 (64) and parts of slot 3 (63) and slot 5 (65) of candidate channel (60). In this example, therefore, only one CDVCC word (74) and two SYNC words (73 and 75) are visible to the mobile. CDVCC words (72 and 76) from slot 3 (63) and slot 5 (65), as well as SYNC word (71) from slot 3 (63), are not visible. The specific word availability is entirely dependent upon the time alignment of the current channel (40) with respect to the candidate channel (60).

The time taken by the mobile receiver oscillator to tune from channel to another generally ranges from 1 to 2 ms. Assuming this time period to be 2 ms, the time window available for the mobile station to synchronize and read the CDVCC is 13.33–4 or 9.33 ms. Since one time slot is 6.6 ms long, in any alignment at least one CDVCC and one SYNC word will be visible to the mobile station during this time window. Since synchronizing to a candidate handoff channel and reading and decoding the CDVCC are the essential features of the present mobile assisted handoff procedure, it is necessary that a non-coherent demodulator be used at the mobile receiver so as to save the time required to acquire carrier synchronization.

When the mobile station receives the second measurement order, it tunes to one of the candidate handoff channels in one of the 13.33 ms idle periods. As soon as the receiver oscillator is tuned to the candidate channel, the output samples of the demodulator are saved in memory for a period of the visible time window. For reference and subsequent discussions, let this set of samples corresponding to the visible time window be denoted by WIN and the number of samples in WIN be denoted by $N_s$. This data is correlated with the six SYNC words defined by IS-136. These six correlations may be performed either in serial or in parallel. The algorithms for both the serial and parallel methods along with their advantages and disadvantages are described in more detail below.

Serial Method for SYNC Word Correlation initialize peak_corr to all 0's
    for i=1 to 6 (number of SYNC words)
      for j=1 to ($N_s$–length of SYNC word) (# of samples)
        corr=0
        for k=1 to length of SYNC word
          corr=corr+WIN(j+k–1)*SYNC (i) (k)
        end
        if corr>peak corr (i)
          peak_corr (i)=corr
          peak_index (i)=j
        end
      end
    end The advantage of the serial correlation method is that after the peak correlation for one SYNC word has been determined, all the values of the correlation values calculated with respect to that SYNC word can be discarded, thus reducing the amount of memory required for the procedure. The disadvantage is that since the entire process is staggered in time, it takes more time than parallel processing and may require off-line processing after the mobile receiver has return to its current channel.

Parallel Method for SYNC Word Correlation initialize corr to all 0's
    for i=1 to ($N_s$–length of SYNC word)
      for j=1 to length of SYNC word
        corr(1)(i)=corr(1)(i)+WIN(i+j–1)*SYNC(1)(j)
        corr(2)(i)=corr(2)(i)+WIN(i+j–1)*SYNC(2)(j)
        corr(3)(i)=corr(3)(i)+WIN(i+j–1)*SYNC(3)(j)
        corr(4)(i)=corr(4)(i)+WIN(i+j–1)*SYNC(4)(j)
        corr(5)(i)=corr(5)(i)+WIN(i+j–1)*SYNC(5)(j)
        corr(6)(i)=corr(6)(i)+WIN(i+j–1)*SYNC(6)(j)
      end
    end
    for i=1 to 6
    peak_corr(i)=peak value of row i of corr
    peak_index(i)=index at value of peak_corr(i)
    end The disadvantage of the parallel correlation method is the necessity of storing all of the correlation values before being able to choose the peak correlations. It also requires the ability to perform six correlations in parallel. The advantage is that since all six correlations are calculated in parallel, the results may be obtained much faster than with the serial method.

Once the peak correlations for each of the six SYNC words have been determined, the following algorithm is used to select the SYNC word that was most likely transmitted along with the optimum offset location of a CDVCC word from this SYNC word. Reference is made to FIG. 4 for the relative positions of the CDVCC words (82 and 84) and the SYNC words (81 and 83) for time slots (86 and 88) in the candidate channel (80).

Optimum Peak Search
```
    best_peak=0
    best_peak index=0
    for i=1 to 6
        if peak_corr(i)>best_peak
            is peak_index(i) such that the CDVCC samples at 71
                symbols after the SYNC word are within the visible
                window?
                if yes,
                    best_peak=peak_corr(i)
                    best_peak_index=peak_index(i)
                else,
                    is peak_index(i) such that the CDVCC samples
                        (corresponding to the previous slot) at 91 symbols
                        before the SYNC word are within the visible
                        window?
                        if yes,
                            best_peak=peak_corr(i) best_peak_index=
                                peak_index(i)
                    end
            end
        end
    end
```

The above algorithm ensures that as long as there is one SYNC words and one CDVCC present within the visible time window, the mobile station will be in a position to read the CDVCC if the correct SYNC word can be detected. Based on the outcome of this algorithm, the samples corresponding to the CDVCC are demodulated via classical "hard decision" techniques. (Samples are compared to a threshold, with bit decisions dependent upon whether the sample is greater or less than the threshold.) The resulting CDVCC bits are then decoded using a (12, 8) shortened Hamming code decoder to give the DVCC. The mobile station may then use the SACCH field in its uplink slot to transmit this received DVCC back to its current base station. After the DVCCs for all of the three candidate base station channels on the list have been reported, the network has the information about the signal strengths and the DVCCs for the three most likely handoff channels and can make a handoff decision accordingly.

This information is useful in situations where the candidate base station channel has a strong co-channel interferer because in such a case the RSS value reported by the mobile station may give a false indication of the actual signal strength of the channel. If the network does not have any other information apart from the signal strength reported by the mobile station, it may hand the mobile off to this candidate base station channel (whose reported RSS value was high but actually the signal strength was low), resulting in a dropped call.

This improved mobile assisted handoff function on the mobile receiver requires that a certain amount of computational power and memory be available on the mobile station. The amount of time required to perform the additional functions may depend upon hardware factors such as memory and the digital signal processor available on the mobile receiver. Estimates regarding the additional amount of processing and memory required to implement the mobile assisted handoff procedures of the present invention may be calculated as follows.

Processing Capacity:

Operations required to perform six correlations:
38136*(no. of samples/symbol) operations (1 operation=1 multiplication and 1 addition)

Memory Requirements:
454*(no. of samples/symbol) real samples for storing the original time window
227*(no. of samples/symbol) real samples to store correlation values for serial method
1362*(no. of samples/symbol) real samples to store correlation values for parallel method Total:
681*(no. of samples/symbol) for serial correlation method
1816*(no. of samples/symbol for parallel correlation method Both the memory and operation requirements mentioned above depend upon the number of times a symbol is sampled (samples/symbol) at the receiver. The amount of processing power and memory required therefore increase with an increase in the number of samples per symbol.

To further complicate matters, with poor channel conditions more than one error may occur in the received CDVCC (up to one error in the received CDVCC can be corrected in the Hamming code decoding process) or a SYNC word may not be detected. In both of these cases, the mobile station may not be able to obtain a correct DVCC during that particular visible window of time. This situation can be denoted as a "miss", indicating that the mobile station missed obtaining a correct DVCC during the attempt. In such an instance, it must wait for its next idle period for another attempt on the same candidate channel. Increasing the allowable number of attempts by the mobile station will increase the probability of obtaining the correct DVCC for that candidate channel.

Figure 5:
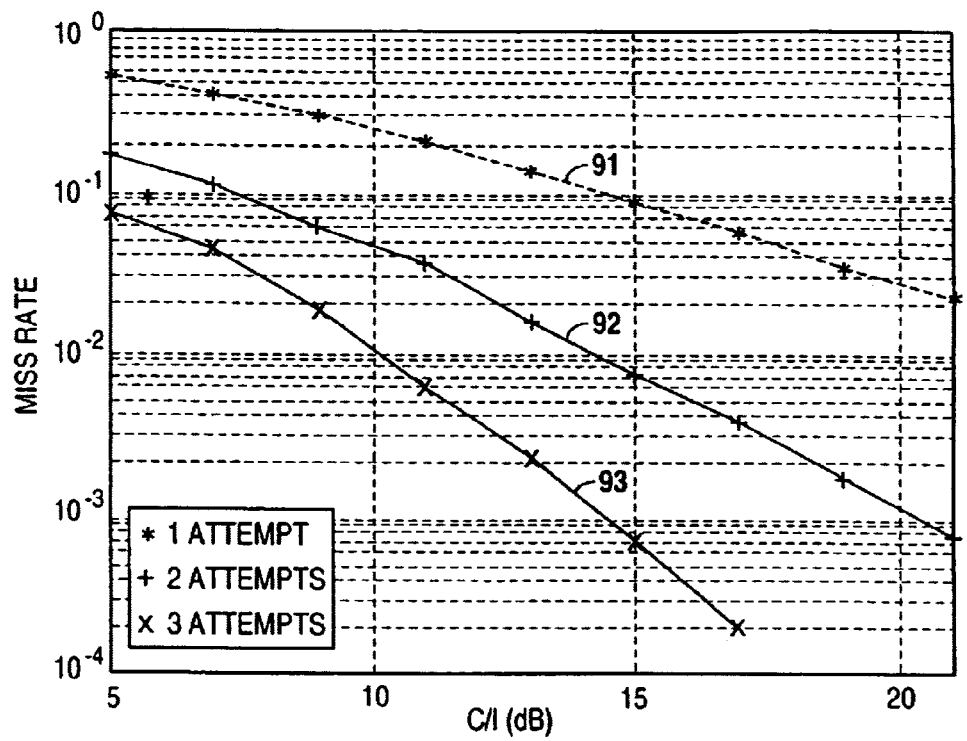
FIG. 5 is a graphic representation of the miss rate versus the C/I for a vehicle speed of 100 Kmph when the allowable number of attempts made by the mobile to read the CDVCC range from 1 to 3.
Figure 6:
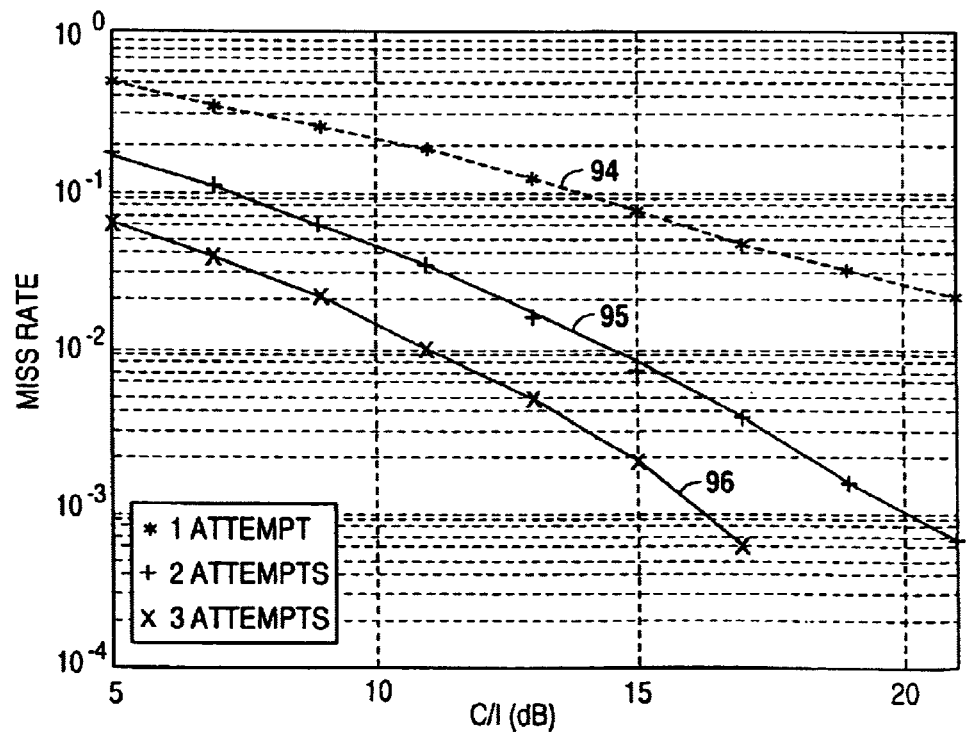
FIG. 6 is a graphic representation of the miss rate versus the C/I for a vehicle speed of 8 Kmph when the allowable number of attempts made by the mobile to read the CDVCC range from 1 to 3.

Simulation results for missed rate versus C/I ratio are shown in FIGS. 5 and 6 for vehicle speeds of 100 Kmph and 8 Kmph, respectively. The curves indicate that as the number of allowable attempts by the mobile increases from 1 to 3, the miss rate drops sharply. These results have been obtained by using two samples per symbol at the receiver. Table 1 below shows miss rates for the number of samples per symbol varying from one to six for a vehicle speed of 100 Kmph, a C/I of 15 dB and one allowable attempt. The results indicate that the returns diminish in comparison to the increasing complexity as the samples per symbol exceeds two.

TABLE 1

| Samples/Symbol | Miss Rate |
| --- | --- |
| 1 | 0.099159 |
| 2 | 0.090909 |
| 4 | 0.090009 |
| 6 | 0.082358 |

These results indicate that in a preferred embodiment of the system and method of the present invention optimum results can be achieved by utilizing two samples per symbol at the receiver. The processing power and memory requirements, therefore, in the preferred embodiment are as follows:

Processing Capacity:
Operations Required to Perform Six Correlations:
38136*2=76272 operations
Memory Requirements:
681*2=1362 bits for Serial Correlation Method
1816*2=3632 bits for Parallel Correlation Method It is worth noting, that the simulation results contained herein assume "rectangular" pulse shapes. In the actual IS-136 system, low pass filtering is employed in the transmitter as defined in the IS-136 standard. Filtering is also typically employed in the receiver. The effect of filtering is to degrade the performance from that predicted in FIGS. 5 and 6, but the degree of degradation is expected to be negligible.

It is anticipated that these processing and memory requirements are either already within the limitations of existing digital cellular mobile stations or are within modifications easily implemented in existing mobile stations. The method of the present invention is, therefore, capable of implementation within the current confines of the IS-136 format and the technology associated with the tuning and data acquisition rates of existing mobile stations.

Although the present invention has been described in conjunction with a pre-defined format, it is anticipated that the steps involved in the present invention are applicable under a greater variety of conditions and formats than those described herein. The more specific scope of the present invention can best be identified by reference to the following claims.

We Claim:

1. A method for mobile assisted handoff of a communication link between a mobile station and a base station in a digital cellular communications network, from a current base station to one of a number of candidate base stations within said network, said method comprising the steps of:

generating a list of a plurality of candidate channels for possible acceptance of said communication handoff;

transmitting a first measurement order from said current base station to said mobile station, said first measurement order containing said list of candidate channels;

measuring a received signal strength and a bit error rate at said mobile station for said communication between said mobile station and said current base station;

measuring received signal strength at said mobile station for each of said candidate channels listed in said first measurement order;

transmitting said received signal strength measurements from said mobile station to said current base station;

selecting a plurality of most favorable candidate channels from said received signal strength measurement results;

transmitting a second measurement order from said current base station to said mobile station, said second measurement order containing a list of said most favorable candidate channels;

tuning and synchronizing said mobile station to each of said candidate channels listed in said second measurement order;

reading and decoding an identification code for each of said candidate channels, said step of reading and decoding including:

storing data from said candidate channel into a memory device located on said mobile station;

processing said data by searching for said identification code at a first predetermined number of symbols after the appearance of a probable synchronization word and, if said identification code cannot be found at said first predetermined number of symbols after said probable synchronization word, then searching for said identification code at a second predetermined number of symbols ahead of said probable synchronization word; and identifying said identification code;

transmitting said identification codes for each of said candidate channels from said mobile station to said current base station; and correlating said received signal strength measurements with said identification codes to identify an optimal candidate base station for effecting said handoff of said communication.

2. The method of claim 1, wherein said step of tuning and synchronizing said mobile station comprises tuning to said candidate channel, reading data within a time window on said candidate channel, and returning back to said current base station channel.

3. The method of claim 2 wherein said step of tuning and synchronizing said mobile station further comprises correlating said data from said candidate channel with a plurality of known synchronization words and identifying a most probable synchronization word within said data.

4. The method of claim 2 wherein said step of reading and decoding an identification code further comprises locating said identification code within said time window on said candidate channel by known displacement from said most probable synchronization word identified within said data.

5. The method of claim 1 wherein said digital communication channels are formatted according to IS-136 standards for digital cellular radio communication and said candidate channel received signal strength measurements and said identification code readings are made by said mobile station during idle time slots within a frame.

6. The method of claim 1 wherein said identification code comprises a digital voice color code word in said candidate channel.

7. The method of claim 1 further comprising the step of monitoring threshold received signal strength values for said current channel and said candidate channels after said step of transmitting said received signal strength measurements form said mobile station to said current base station, said threshold values determining when selection and activation of said handoff should occur.

* * * * *

UNITED STATES PATENT AND TRADEMARK OFFICE
CERTIFICATE OF CORRECTION

PATENT NO. : 6,694,138 B1
DATED : February 17, 2004
INVENTOR(S) : Richard A. Kobylinski et al.

It is certified that error appears in the above-identified patent and that said Letters Patent is hereby corrected as shown below:

Column 10,
Line 52, before "said mobile" delete "form" and substitute -- from -- in its place.

Signed and Sealed this

Twenty-second Day of March, 2005

JON W. DUDAS
*Director of the United States Patent and Trademark Office*